United States Patent
Wang et al.

(10) Patent No.: US 8,477,196 B2
(45) Date of Patent: Jul. 2, 2013

(54) MOBILE DEVICE AND METHOD FOR VIDEO RECORDING

(75) Inventors: Chi-Chih Wang, Taipei Hsien (TW); Quan-Zhong Zhang, Shenzhen (CN); Fei Huo, Shenzhen (CN); Zhi-Ming Huang, Shenzhen (CN)

(73) Assignees: GDS Software (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 246 days.

(21) Appl. No.: 12/862,774

(22) Filed: Aug. 25, 2010

(65) Prior Publication Data

US 2011/0187872 A1 Aug. 4, 2011

(30) Foreign Application Priority Data

Feb. 2, 2010 (CN) .......................... 2010 1 0301108

(51) Int. Cl.
*H04N 5/225* (2006.01)

(52) U.S. Cl.
USPC ...................................... 348/207.1; 348/211.3

(58) Field of Classification Search
USPC ................... 348/207.1, 211.99, 211.1–211.3, 348/211.14; 709/223
See application file for complete search history.

(56) References Cited

U.S. PATENT DOCUMENTS

| | | | |
|---|---|---|---|
| 7,605,846 B2* | 10/2009 | Watanabe | 348/211.1 |
| 2004/0109063 A1* | 6/2004 | Kusaka et al. | 348/207.1 |
| 2005/0241004 A1* | 10/2005 | Pyhalammi | 726/29 |
| 2005/0285944 A1* | 12/2005 | Watanabe et al. | 348/207.1 |
| 2007/0192464 A1* | 8/2007 | Tullberg et al. | 709/223 |

* cited by examiner

*Primary Examiner* — Gevell Selby
(74) *Attorney, Agent, or Firm* — Altis Law Group, Inc.

(57) ABSTRACT

A mobile device comprises a built-in camera connects to a monitoring server via a communication network. The mobile device records a video feed and compresses the recorded video feed. The mobile device uploads the compressed video to the monitoring server. The mobile device can log in to the monitoring server to watch the uploaded video feed.

10 Claims, 3 Drawing Sheets

MOBILE DEVICE AND METHOD FOR VIDEO RECORDING

BACKGROUND

1. Technical Field

Embodiments of the present disclosure relate to video recording, and more particularly to a mobile device and method for video recording.

2. Description of Related Art

Currently, many network monitoring systems use web cameras. However, the cost of the hardware of such systems is very high. In addition, some monitoring sites do not require 24/7 surveillance.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used herein, refers to logic embodied in hardware or firmware, or to a collection of software instructions, written in a programming language, for example, Java, C, or Assembly. One or more software instructions in the module may be integrated in firmware, such as an EPROM. It will be appreciated that module may comprise connected logic units, such as gates and flip-flops, and may comprise programmable units, such as programmable gate arrays or processors. The units described herein may be implemented as software and/or hardware unit and may be stored in any type of computer-readable medium or other computer storage device.

Figure 1:
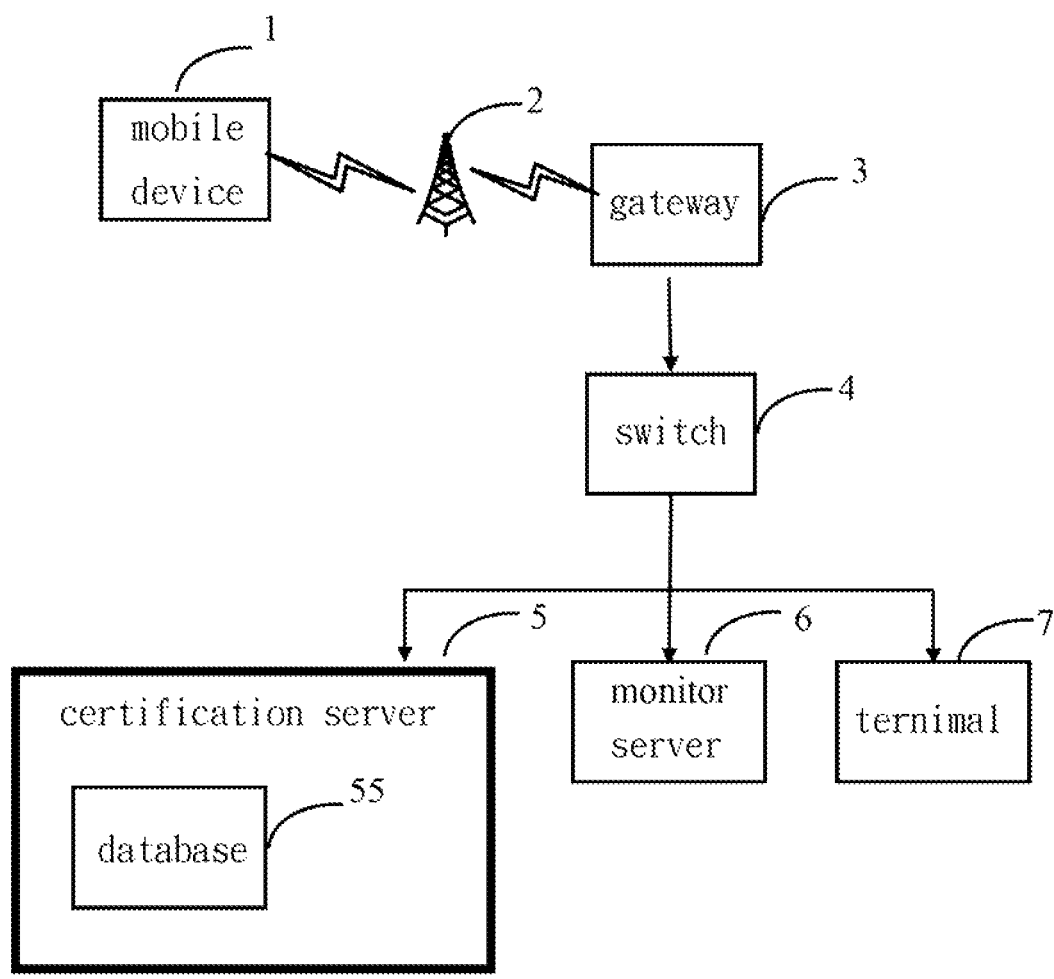
FIG. 1 is a schematic diagram of a monitoring system using one embodiment of a mobile device as a monitoring device.

FIG. 1 is a schematic diagram of a monitoring system, using a mobile device 10 as a monitoring device. The monitoring system includes a base station 2, a gateway 3, a switch 4, a certification server 5, a monitoring server 6, and a terminal 7. In the embodiment, the mobile device 10 comprises a camera device 30. The mobile device 10 electronically communicates with the monitoring server 6 via the base station 2, the gateway 3, and the switch 4. The mobile device 10 uploads a video feed to the monitoring server 6. The terminal 7 electronically communicates with the monitoring server 6 via the switch 4. The mobile device 10 and the terminal 7 can access the monitoring server 6 to play the uploaded video feed. The certification server 5 verifies legitimacy of the mobile device prior to the mobile device connects to the monitoring server 6. The mobile device is legitimate once registered to the certification server 5. Depending on the embodiment, the mobile device 10 can be a mobile phone, or a digital camera.

In the embodiment, the mobile device 10 sends an electronic signal to the monitoring server 6 (hereinafter "the access request"), so as to set up a connection between the mobile device 10 and the monitoring server 6. The access request is bundled with parameters for the connection. The parameters includes a media access control (MAC) address of a subscriber identity module (SIM) card of the mobile device 10, a user name, and a password. The parameters are previously stored in a database 55 of the certification server 5. The certification server 5 acquires the MAC address from the access request, and consults the database 55 for the acquired MAC address. If the MAC address is not in the database 55, the certification server 5 sends a denial response to the mobile device 10 to inform the mobile device 10 that the access request has been denied. If the MAC address is in the database 55, the certification server 5 acquires the user name and password from the access request, and checks if the acquired user name and password match the user name and password corresponding to the MAC address in the database 55. The certification server 5 sends a security certification to the mobile device 10, if the acquired user name and password match the user name and password corresponding to the MAC address in the database 55. Otherwise, the certification server 5 sends a decline response to the mobile device 10. The mobile device 10 sets up a connection with the monitoring server 6 after receiving the security certification from the certification server 5.

In the embodiment, the mobile device 10 compresses the recorded video feed prior to uploading. The mobile device sends the compressed video feed to the base station 2, where the compressed video feed is transformed into an optical signal. The base station 2 sends the optical signal to the gateway 3, where the optical signal is transformed into an electronic signal. The gateway 3 sends the electronic signal to the switch 4. The switch 4 sends the electronic signal to the monitoring server 6, where the electronic signal is stored.

Figure 2:
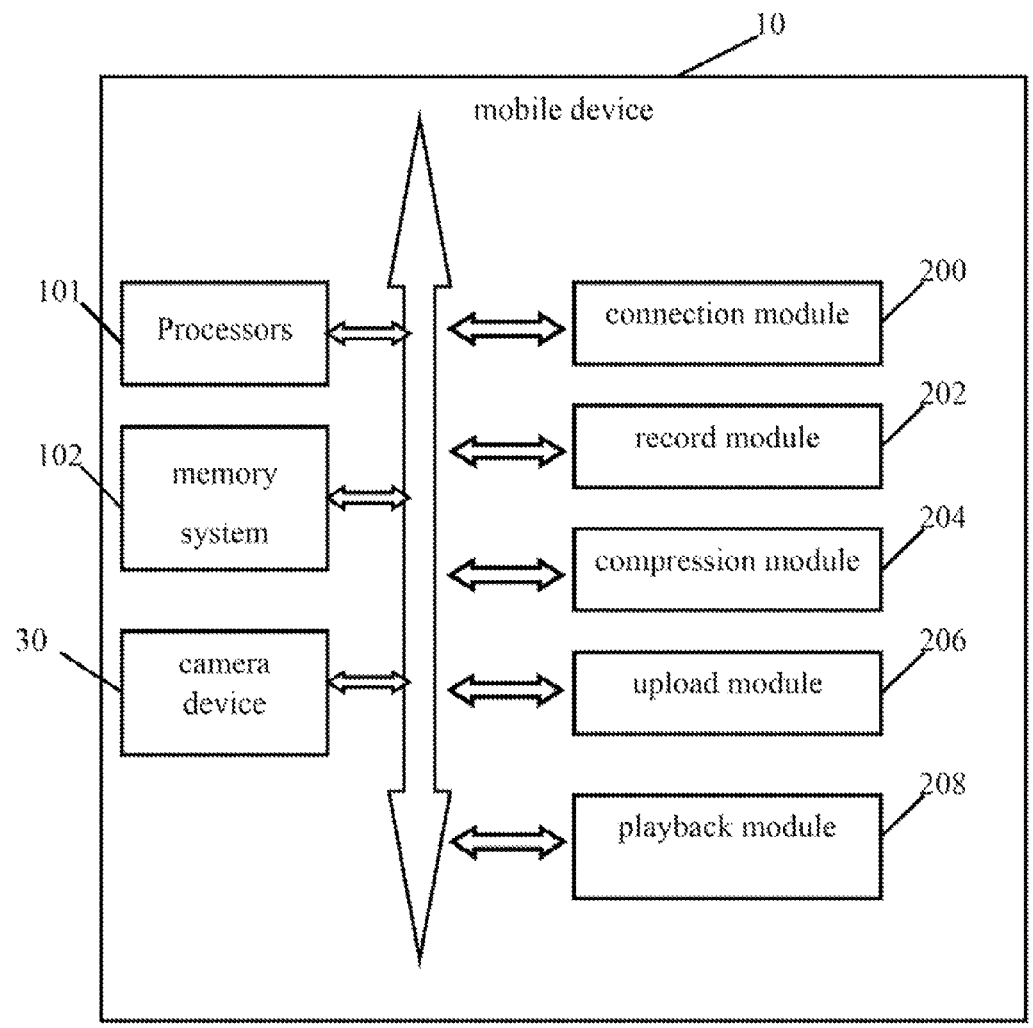
FIG. 2 is a block diagram of one embodiment of the mobile device in FIG. 1.

FIG. 2 is a block diagram of one embodiment of the mobile device 10, including programs including a connection module 200, a record module 202, a compression module 204, an upload module 206, and a playback module 208. One or more computerized codes of the modules 200-208 are stored in a memory system 102 and executed by one or more processors 101 of the mobile device 10.

In the embodiment, the connection module 200 sets up a connection with the monitoring server 6 after receiving the security certification from the certification server 5. The record module 202 controls the camera device 30 to record the video feed. The compression module 204 compresses the recorded video feed with MP4 or H.264 codec. The upload module 206 uploads the compressed video feed via the connection set up by the connection module 200. The playback module 208 retrieves the uploaded video feed from the monitoring server 6 via a communication network and plays the retrieved video feed on the mobile device 10. The communication network can be the Internet, a cable network, or a WIFI network.

Figure 3:
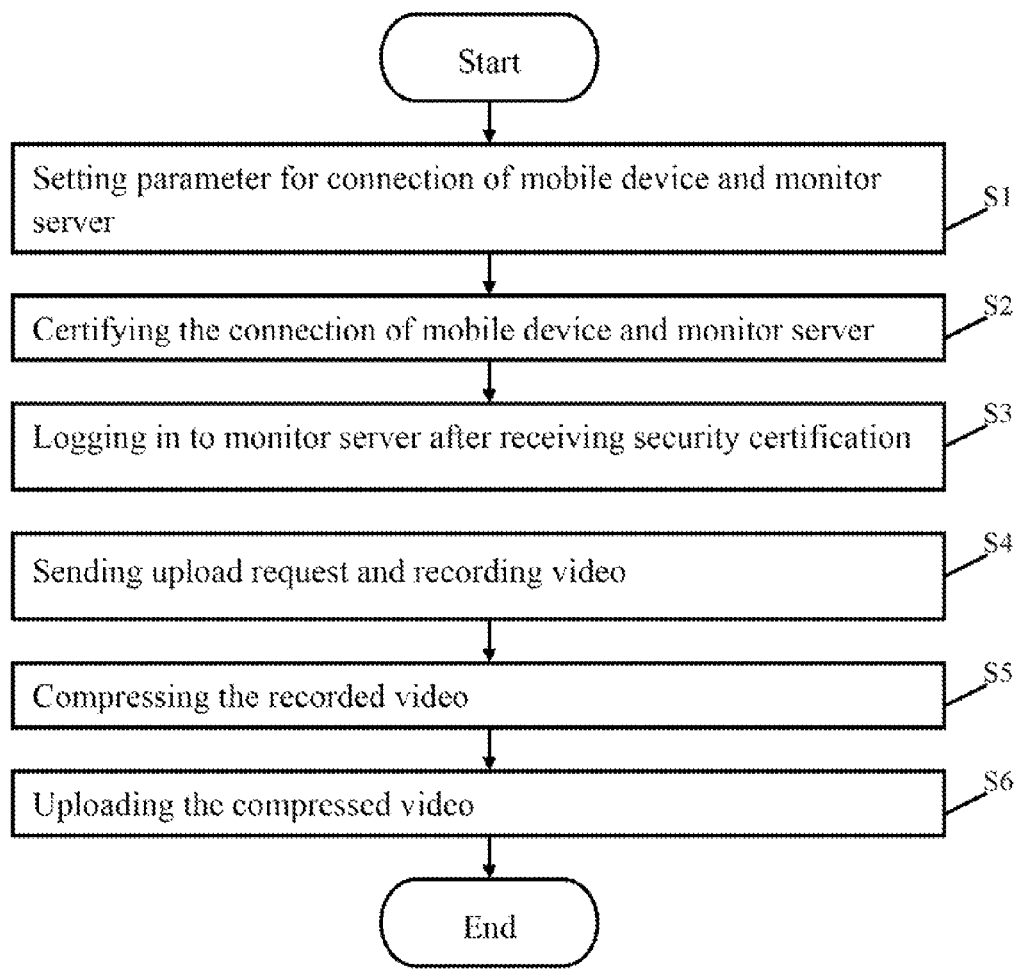
FIG. 3 is a flowchart illustrating one embodiment of a method for video recording.

FIG. 3 is a flowchart of one embodiment of a method for video recording using the electronic device 10. Depending on the embodiments, additional blocks may be added, others removed, and the ordering of the blocks may be changed.

In block S1, the mobile device 10 sets the parameters for connection with the monitoring server 6. The mobile device 10 bundles the parameters with the access request to the monitoring server 6. In the embodiment, the parameters are stored in the database 55 in the certification server 5.

In block S2, the certification server 5 acquires the MAC address from the access request, and consults the database 55 for the acquired MAC address. If the Mac address is not in the database 55, the certification server 5 sends the denial response to the mobile device 10 to inform the mobile device 10 that the access request has been denied. If the MAC address is in the database 55, the certification server 5 acquires the user name and password from the access request, and checks if the acquired user name and password match the user name and password corresponding to the MAC address in the database 55. The certification server 5 sends the security certification to the mobile device 10, to see if the acquired user name and password match the user name and password corresponding to the MAC address in the database 55.

In block S3, the mobile device 10 logs in to the monitoring server 6 with the certified username and password. The mobile device 10 sets up a connection with the monitoring server 6. In block S4, the mobile device 10 sends an upload request to the monitoring server and records the video feed. In block S5, the mobile device 10 compresses the recorded video feed with MP4 or H.264 codec. In block S6, the mobile device 10 uploads the compressed video feed via the set up connection.

The method further includes the mobile device 10 retrieving the uploaded video feed from the monitoring server 6 via the communication network and plays the retrieved video feed on the mobile device 10.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A mobile device, comprising:
a camera device;
a memory system;
one or more processors; and
one or more programs stored in the memory system configured to be executed by the one or more processors, the one or more programs comprising:
a connection module to set up a connection to a monitoring server after receiving a security certification from a certification server;
a record module to control the camera device to record a video feed;
a compression module to compress the recorded video feed;
a upload module to upload the compressed video feed to the monitoring server, wherein the compressed video feed is sent to a base station and transformed to an optical signal, prior to being sent to a gateway and transformed to an electronic signal, prior to being sent to a switch, and prior to being sent to the monitoring server and stored in a memory system thereof; and
a playback module to play the uploaded video feed on the monitoring server;
wherein a plurality of parameters of the mobile device are stored in a database of the certification server and bundled with an access request upon sending to the monitoring server, the plurality of parameters comprising a MAC address of a SIM card of the mobile device, a user name, and a password;
wherein the certification server verifies legitimacy of the mobile device by checking if the MAC address in the access request is in the database, and checking if the user name and password in the access request match the user name and password corresponding to the MAC address in the database.

2. The device as claimed in claim 1, wherein the certification server acquires the plurality of parameters from the access request from the mobile device and sends a security certification to the mobile device if all the plurality of parameters are matched in the database of the certification server.

3. A computerized method, comprising:
setting a plurality of parameters of a mobile device for connection to a monitoring server, the plurality of parameters comprising a MAC address of a SIM card of the mobile device, a user name, and a password;
sending an access request bundled with the plurality of parameters to the monitoring server;
logging in to the monitoring server after receiving a security certification from a certification server;
sending an upload request to the monitoring server;
recording a video feed using a camera device;
compressing the recorded video feed; and
uploading the compressed video feed to the monitoring server;
wherein the plurality of parameters are stored in a database of the certification server ;
wherein the certification server verifies legitimacy of the mobile device by checking if the MAC address in the access request is in the database, and checking if the user name and password in the access request match the user name and password corresponding to the MAC address in the database.

4. The computerized method as claimed in claim 3, the certification comprising:
acquiring the MAC address from the access request from the mobile device;
acquiring the user name and password from the access request from the mobile device if the MAC address is in the database of the certification server; and
sending a security certification to the mobile device if the acquired user name and password match the user name and password corresponding to the MAC address in the database of the certification server.

5. The computerized method as claimed in claim 3, further comprises playing the uploaded video feed on the monitoring server.

6. The computerized method as claimed in claim 3, wherein the uploading comprising:
sending the compressed video feed to a base station;
transforming the compressed video feed to an optical signal prior to sending the optical signal to a gateway;
transforming the optical signal to an electronic signal prior to sending the electronic signal to a switch;
sending the electronic signal to the monitoring server; and
storing the electronic signal in a memory system of the monitoring server.

7. A non-transitory computer readable storage medium having stored therein instructions, that when executed by one or more processors of a mobile device with a camera device, cause the device to:
set a plurality of parameters of the mobile device for connection to a monitoring server, the plurality of parameters comprising a MAC address of a SIM card of the mobile device, a user name, and a password;
send an access request bundled with the plurality of parameters to the monitoring server;
log in to the monitoring server after receiving a security certification from a certification server;
send an upload request to the monitoring server;
record a video feed using the camera device;
compress the recorded video feed; and
upload the compressed video feed to the monitoring server;
wherein the plurality of parameters are stored in a database of the certification server;
wherein the certification server verifies legitimacy of the mobile device by checking if the MAC address in the access request is in the database, and checking if the user name and password in the access request match the user name and password corresponding to the MAC address in the database.

8. The non-transitory computer readable storage medium as claimed is claim 7, the certification comprising:
   acquiring the MAC address from the access request from the mobile device;
   acquiring the user name and password from the access request from the mobile device if the MAC address is in the database of the certification server; and
   sending a security certification to the mobile device if the acquired user name and password match the user name and password corresponding to the MAC address in the database of the certification server.

9. The non-transitory computer readable storage medium as claimed is claim 7, further comprises playing the uploaded video feed on the monitoring server.

10. The non-transitory computer readable storage medium as claimed is claim 7, wherein the uploading comprising:
   sending to the compressed video feed a base station;
   transforming the compressed video feed to an optical signal prior to sending the optical signal to a gateway;
   transforming the optical signal to an electronic signal prior to sending the electronic signal to a switch;
   sending the electronic signal to the monitoring server; and
   storing the electronic signal in a memory system of the monitoring server.

\* \* \* \* \*